United States Patent
Mittal

(10) Patent No.: US 11,450,104 B1
(45) Date of Patent: Sep. 20, 2022

(54) IDENTIFICATION AND OBFUSCATION OF OBJECTIONABLE CONTENT FROM VIDEO STREAM

(71) Applicant: Amazon Technologies, Inc., Seattle, WA (US)

(72) Inventor: Amit Mittal, Hyderabad (IN)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 186 days.

(21) Appl. No.: 16/828,161

(22) Filed: Mar. 24, 2020

(51) Int. Cl.
| | |
|---|---|
| H04N 7/15 | (2006.01) |
| G06V 20/40 | (2022.01) |
| G06T 7/11 | (2017.01) |
| G06T 5/00 | (2006.01) |
| H04N 7/01 | (2006.01) |
| H04N 7/04 | (2006.01) |
| G06T 7/269 | (2017.01) |
| G06T 7/215 | (2017.01) |
| G06T 5/20 | (2006.01) |
| H04N 21/2187 | (2011.01) |
| G06T 7/00 | (2017.01) |
| G06V 40/10 | (2022.01) |

(52) U.S. Cl.
CPC ............ *G06V 20/41* (2022.01); *G06T 5/002* (2013.01); *G06T 5/20* (2013.01); *G06T 7/0002* (2013.01); *G06T 7/11* (2017.01); *G06T 7/215* (2017.01); *G06T 7/269* (2017.01); *G06V 40/10* (2022.01); *H04N 7/0127* (2013.01); *H04N 7/04* (2013.01); *H04N 7/15* (2013.01); *H04N 21/2187* (2013.01); *G06T 2207/10016* (2013.01); *G06T 2207/20081* (2013.01); *G06T 2207/30196* (2013.01); *G06V 2201/09* (2022.01)

(58) Field of Classification Search
CPC ... H04N 2201/0094; H04N 2201/0039; H04N 1/00347; H04N 1/32085; H04N 1/00244; H04N 1/32502; H04N 1/32507
See application file for complete search history.

(56) References Cited

U.S. PATENT DOCUMENTS

2021/0004962 A1* 1/2021 Tsai .................. G06K 9/726

FOREIGN PATENT DOCUMENTS

EP 1228641 6/2001

* cited by examiner

*Primary Examiner* — Samira Monshi
(74) *Attorney, Agent, or Firm* — K&L Gates LLP

(57) ABSTRACT

Techniques are generally described for removal of objectionable content from video streams. In various examples, a first frame of image data comprising a two-dimensional grid of pixels is received. First data identifying at least one pixel of the first frame for obfuscation prior to display by a recipient computing device may be received. In some examples, a first segmentation map may be generated based at least in part on the first data. In some examples, pixel values of one or more pixels of the first frame of image data may be changed according to the first segmentation map. In some examples, the first frame of image data may be sent to a recipient computing device.

20 Claims, 7 Drawing Sheets

IDENTIFICATION AND OBFUSCATION OF OBJECTIONABLE CONTENT FROM VIDEO STREAM

BACKGROUND

Video and/or other media may be sent between computing devices over a network. In some examples, videos may be encoded by a sender computing device, sent to a recipient computing device, where it is decoded and played back while subsequent portions of the video are still being transmitted to the recipient computing device. Such video transmission and playback is often referred to as "streaming." In some other examples, videos and/or other media may be encoded by a server and sent to one or more remote computing devices for further processing. Network conditions can change during transmission of video and/or other media for various reasons. For example, network conditions may sometimes deteriorate which may lead to delays in streaming of video and/or other data.

DETAILED DESCRIPTION

Figure 1:
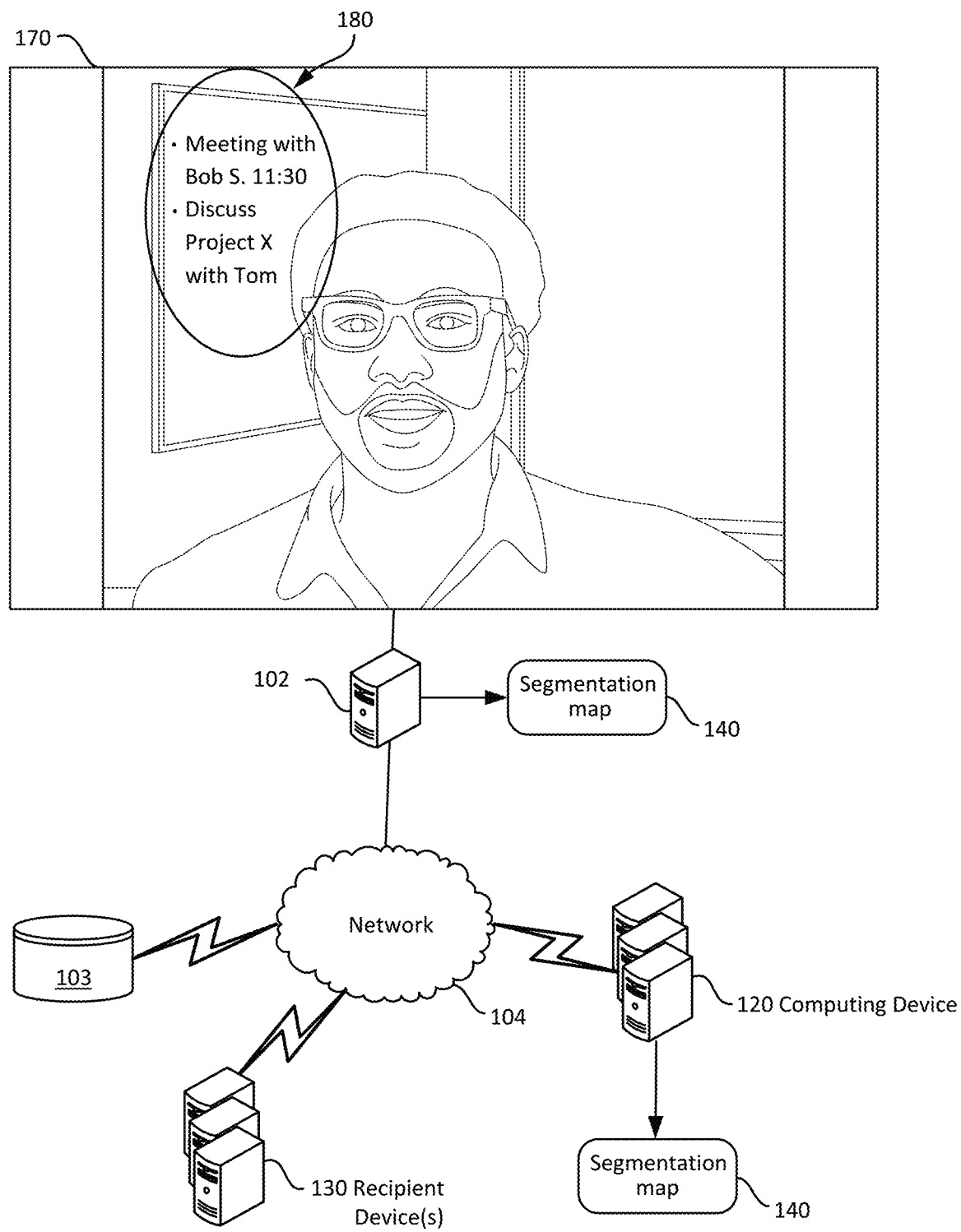
FIG. 1 depicts a system for identifying and removing/obfuscating objectionable content from a video stream, in accordance with various embodiments of the present disclosure.

In the following description, reference is made to the accompanying drawings which illustrate several embodiments of the present disclosure. It is understood that other embodiments may be utilized and mechanical, compositional, structural, electrical operational changes may be made without departing from the present disclosure. The following detailed description is not to be taken in a limiting sense, and the scope of the embodiments of the present invention is defined only by the claims of the issued patent.

Video may be encoded with various transmission attributes (e.g., bitrates, resolutions, profiles, frame rates, etc.) prior to sending the video over a network to a remote computing device. Web Real-Time Communication ("WebRTC") comprises a number of communication protocols and application programming interfaces ("APIs") that enable real time communication over peer-to-peer connections. WebRTC may use Real-time Transport Control Protocol ("RTCP") to transmit audio and/or video over a network.

WebRTC and/or other video transmission and/or encoding/decoding techniques may be used in video conferencing (sometimes referred to as "video calling" or "video chat") technologies wherein two or more computing devices send live video and audio to one another to enable communication between individuals. Video calling is quite popular and is used for a variety of purposes including identity verification, interviews, business meetings, social calls, etc.

Often users engaging in video conferencing may face the camera and are depicted in front of a relatively static background. For example, a user that is video chatting using a camera integrated within a laptop may be sitting in a user's bedroom, within the user's office, etc. In many cases, the background remains relatively unchanged during the video conference. However, in some cases, a user may use a mobile device such as a smart phone with an integrated camera to engage in video conferencing. In such cases, a user may move around while video conferencing resulting in a changing background.

Particularly, in the case of a stationary user, it may be advantageous to remove and/or obfuscate certain content that the user does not want visible to other parties to the video chat. For example, a user may be video chatting in the user's bedroom. The video chat may be a job interview that is of a formal nature. Accordingly, the user may not want the interviewer(s) to see the interior of the user's bedroom during the video chat interview. In another example, a user may be video chatting in an office and/or a conference room. There may be sensitive and/or confidential information written on a whiteboard in the conference room. Accordingly, the user may wish to conduct the video chat without the other participants being able to see and/or read the sensitive and/or confidential material. In other examples, a user may want to blur out logos and/or written information on a user's t-shirt during a video call.

In an embodiment described herein, prior to sending video data, a user is presented with an interface showing an example of what a recipient (e.g., another participant) in the video conference will see during the conference. Through the interface, the user is able to select one or more points and/or regions that include "objectionable" content. As used herein, "objectionable" content refers to any content that the user would like removed and/or obfuscated, so that the recipient is unable to see (or clearly see) the content. Similarly, the user is able to select one or more points and/or regions that include non-objectionable content. These are the portions of the image that the user would like the recipient to see clearly. Most typically, the non-objectionable content includes the user's face. However, there may be scenarios in which the user would like to blur and/or otherwise obfuscate the user's face, in order to remain anonymous, for example. The selected "objectionable" and/or "non-objectionable" regions and/or pixels provided by the user is referred to herein as indicator data.

The selected objectionable points and/or regions as well as the selected non-objectionable points and/or regions are provided, along with the frame of image data to a machine learning model trained to perform segmentation. In computer vision, segmentation refers to the task of partitioning an image into multiple segments (e.g., sets of pixels). In the embodiments described herein, an image is segmented by the machine learning model into one or more regions of objectionable pixels and one or more regions of non-objectionable pixels. Accordingly, the output of the machine learning model is a segmentation map. The segmentation map (sometimes called a "segmentation mask") is a pixel-wise map that denotes whether each pixel corresponds to "objectionable" or "non-objectionable" (e.g., in a simple binary example by encoding each pixel with a binary label value such as "1" indicating non-objectionable and a "0" indicating objectionable). In various examples, there may be multiple different segments apart from only "objectionable" or "non-objectionable." For example, a user may want some content blurred, some content to appear clearly, and other still other content to be replaced by a solid, opaque color. In such examples, the machine learning model may output a segmentation map that encodes each pixel as belonging to one of the three classes just described.

There are a variety of different segmentation algorithms known to those skilled in the art. In an example, the K-means algorithm may be used to partition image data (e.g., a frame of image data comprising a two-dimensional grid of pixels) into K clusters—where the pixels of each cluster belong to the same class in the segmentation map. In such an example, the indicator data (e.g., the selected "objectionable" and/or "non-objectionable" regions and/or pixels provided by the user prior to commencement of the video chat) may define "objectionable" and/or "non-objectionable" clusters. Pixels similar to the pixels labeled as "objectionable" may be assigned to an "objectionable" cluster and pixels similar to the pixels labeled as "non-objectionable" may be assigned to a "non-objectionable" cluster. The machine learning model may find cluster centers (e.g., using the K-means++algorithm) and may assign each pixel in the image to the cluster that minimizes the distance between the pixel and the cluster center. The distance may be the squared or absolute difference between a pixel value and the pixel value of the cluster center. The difference may be based on the pixel values such as luminance, chrominance, location, etc.

In addition to the K-means segmentation technique described above, in other embodiments, different segmentation algorithms may be used. For example, histogram-based methods, thresholding, edge detection, graph partitioning, etc., may be used, in accordance with the desired implementation.

In WebRTC a sending device sends packets of encoded video that may be received and decoded by a recipient device. The packets of encoded video may be encoded based on current network conditions at the time of the encoding. For example, an encoder of the sending device may encode a video stream at a first bitrate based on current network conditions and based on source video complexity (e.g., complexity of frames of image data of the video). Thereafter, network conditions may deteriorate due to increased network traffic and congestion. Accordingly, the end-to-end time between sending a packet of the video by the sending device and receipt of the packet by the recipient device may increase (e.g., the latency may increase). In response to the slowed network conditions, the recipient device may send a Receiver Estimated Maximum Bitrate ("REMB") message. The REMB message may include a field to convey the total estimated available bitrate on the network path to the receiving side of the real-time transport protocol ("RTP") session (e.g., the connection between the sending device and the recipient device). The sending/encoding device may use the bitrate specified in the REMB message to configure the maximum bitrate of the video encoding.

As used herein, the "size" of a frame may refer to the amount of memory needed to store a particular compressed frame and/or the amount of available bandwidth required to transmit the compressed frame. In at least some examples, frames with higher resolution (e.g., more pixels in the two-dimensional grid of the frame) may be larger in size relative to a lower resolution frame. In some further examples, source video content with higher complexity (e.g., content with higher spatial complexity and/or higher motion content (e.g., temporal complexity) may be encoded into frames of larger size as the frames may require more bits to encode relative to a less complex frame. In various examples, the complexity of a frame or group of frames may refer to the amount of bits required to encode the frame. As such, the frame size may be an indicator of the complexity of a frame. Frame complexity may be estimated using various methods and may be estimated prior to encoding a frame to generate a compressed frame.

In the video chat context, a particular segment of a video may comprise one or more frames with relatively low complexity. For example, a number of frames may depict a relatively static background with little or no motion occurring from frame to frame. As such the sum of absolute differences (SAD) calculated for macroblocks of the frame may be relatively low or zero. Accordingly, the number of bits required to encode such frames may decline dramatically, as the frames may be inter-coded with a large percentage of skipped blocks (e.g., blocks of pixels with component values that do not change from frame to frame). Additionally, there may be very little motion data (e.g., motion vectors) associated with the frames, as little movement is depicted in the particular segment of video.

As video chat is often conducting in a stationary environment with little background motion, there may be no need to re-compute segmentation maps on a frame-by-frame basis, as the objectionable content may be in the same position from frame-to-frame. Accordingly, frames of video may be sampled at a sampling frequency for use in generating the segmentation map. For example, a segmentation map may be generated every 30 frames, every 15 frames, every 45 frames, and/or any other suitable threshold number of frames since the last segmentation map was generated. In various examples, if there is significant movement during a segment of video, the bitrate of the video may increase as the number of skipped macroblocks decreases and the number of motion vectors and intra-encoded macroblocks increases. In such examples, the sampling frequency of frames for generation of the segmentation map may be adjusted accordingly. Stated another way, the threshold number of frames since the last segmentation map was generated may be adjusted according to the current bitrate and/or according to prevailing network conditions.

For example, there may be significant motion during a segment of video caused by movement of the camera (e.g., where a mobile device is used to conduct the video chat) and/or due to movement in the frame (e.g., where the user is moving around and/or gesturing). During motion, the portions of the frame that represent the objectionable content may change. Accordingly, the segmentation map may be regenerated even if the number of frames since the last segmentation map was generated does not exceed the threshold number of frames. In various examples, the threshold may be updated based on the changing bitrate of the video stream. For example, increased motion may cause the bitrate to increase, as described above. As such, an increase in the bitrate may cause the sampling frequency to increase (e.g., the threshold quantity of frames between generation of segmentation maps is decreased).

Additionally, the sampling frequency (e.g., threshold number of frames at which to generate segmentation maps)

may be adjusted to maintain a video quality (e.g., a bitrate and/or frame rate) of the video to ensure that quality is not affected through the obfuscation/removal of objectionable content.

After a segmentation map is generated, the segmentation map may be used to change the pixel values of pixels encoded in the segmentation map as corresponding to objectionable content. In various examples, a blur filter (e.g., a Gaussian kernel) may be applied to the objectionable pixels to blur the pixel values to obfuscate the objectionable content. In some other examples, the pixel values of pixels encoded in the segmentation map as corresponding to objectionable content may be changed to a particular color and/or intensity value to remove/obfuscate the objectionable content. For example, the pixel values of the objectionable content (as defined using the most recent segmentation map) may be changed to an opaque color so that only the non-objectionable content is visible to the recipient (when rendered on the recipient's display).

FIG. 1 depicts a system for identifying and removing/obfuscating objectionable content from a video stream, in accordance with various embodiments of the present disclosure.

Computing device 102 may be a sender device with an integrated camera and/or configured in communication with a camera. Computing device 102 may capture image data 170. In the example, image data 170 represents a two-dimensional grid of pixels that, when displayed, depicts a person preparing to engage in video chat. The person is sitting in front of a background that includes some objectionable content 180. The objectionable content 180 may be some information such as sensitive and/or confidential writing that the user does not want the other parties in the video chat to see (or be able to clearly perceive).

Computing device 102 may communicate over a network 104 (e.g., the Internet and/or a local area network) with one or more back-end computing device(s) 120. Additionally, computing device 102 may communicate with one or more recipient devices 130. Recipient devices 130 may be the computing devices participating in the video chat session with computing device 102. In various examples, the sender computing device 102 may communicate directly with recipient device(s) 130 (e.g., via a peer-to-peer (P2P) connection). In other examples, the video chat connection may be hosted by computing device(s) 120.

In the example embodiment where computing device 102 communicates directly with recipient device(s) 130, computing device 102 may generate the segmentation map 140 used to remove/obfuscate objectionable content. Additionally, in various examples, computing device 102 may perform the blur/obfuscation operation to obfuscate and/or remove the objectionable content using the most recent segmentation map. However, in some other examples, back-end computing device(s) 120 may generate the segmentation map 140 and/or may perform the obfuscation/removal operation. Accordingly, sender computing device 102, back-end computing device(s) 120, and/or recipient device(s) 130 may generate the segmentation maps and/or perform the blurring obfuscation operations described herein, according to the particular details of the desired implementation.

One or more non-transitory computer-readable memories 103 may store instructions and/or data that may be used to identify and/or obfuscate objectionable content in a video stream, in accordance with the various embodiments described herein.

Figure 2:
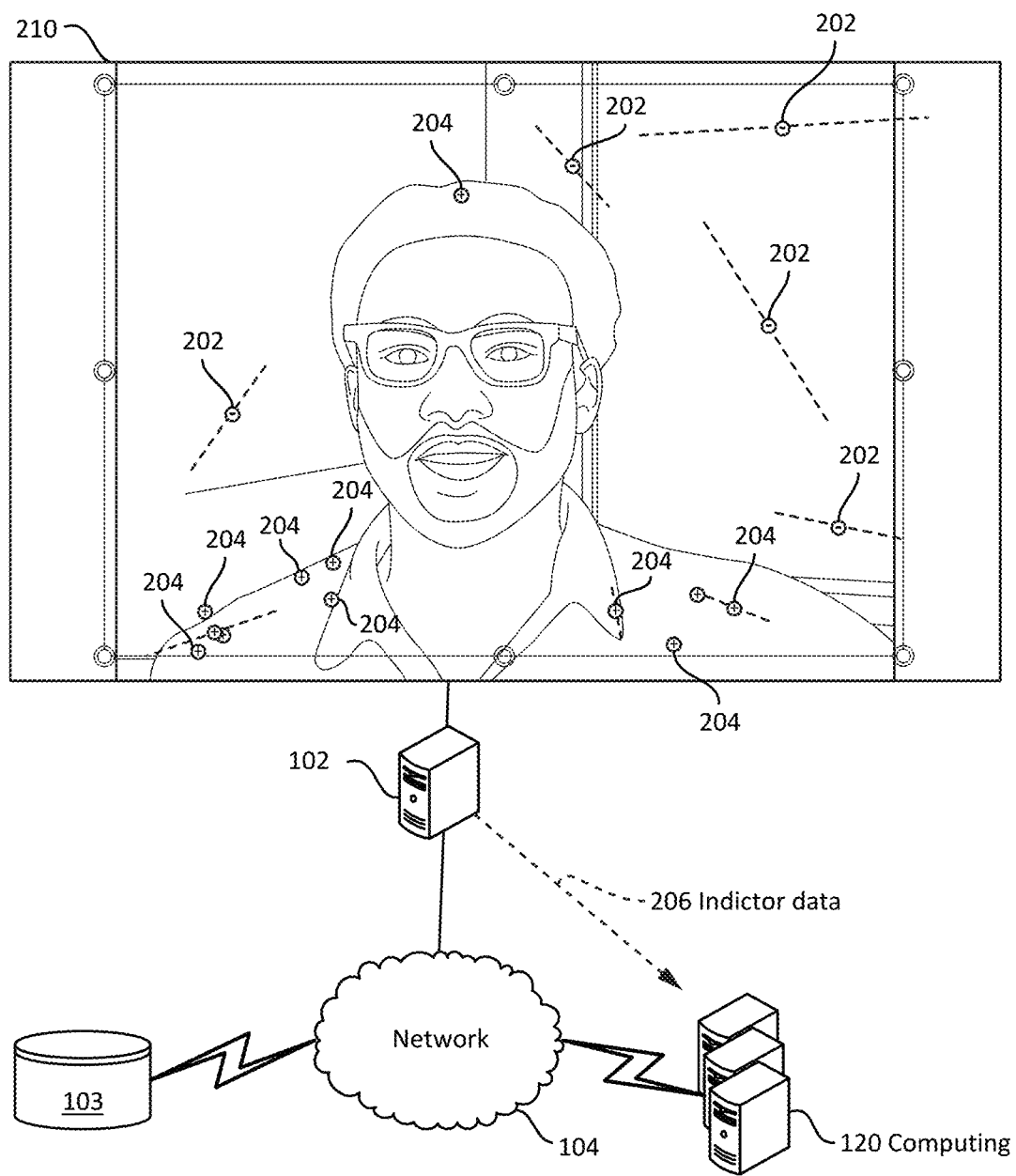
FIG. 2 depicts an example of identifying objectionable and non-objectionable content, in accordance with various aspects of the present disclosure.

FIG. 2 depicts an example of identifying objectionable and non-objectionable content, in accordance with various aspects of the present disclosure. In FIG. 2, upon execution of the video chat application (and/or other video streaming application), the user interface may display a preview image 210. In at least some examples, computing device 102 and/or back-end computing device(s) 120 may generate segmentation map 140 prior to receiving user input. For example, the segmentation map 140 may be generated based on similarities between neighboring pixels in various regions of the preview image 210. The initial segmentation map 140 may, for example, denote pixels depicting a user as foreground pixels and pixels denoting the user's background as background pixels. In some further examples, instead of denoting pixels depicting a user as foreground pixels and pixels denoting the user's background as background pixels, a machine learning model (e.g., a CNN) may be trained to detect objectionable image data present in the preview image(s). For example, a CNN may be trained to recognize logos, writing on whiteboards, calendars, posters, and/or other content that has been labeled as "objectionable" in a training data corpus for the CNN and that has been predicted by the CNN to represent objectionable content in the preview image(s). Accordingly, an initial segmentation map 140 (e.g., a preview segmentation map) may identify segments of the preview image identified as objectionable by the CNN. As described in further detail below, the user may be able to override the initial segmentation map 140 by defining regions as either "objectionable" or "non-objectionable" by selecting regions on the image frame (e.g., on the initial segmentation map 140) and designating the selected regions as "objectionable" or "non-objectionable," as desired.

In various examples, using a CNN to generate an initial prediction as to the objectionable content may blur out only portions of the background predicted to be objectionable, while leaving other portions of the background clearly visible. This may be advantageous in contexts where the user wants at least some portions of the background to be visible to viewers of a video.

Accordingly, the user may be provided with instructions and/or selectable controls to allow the user to designate portions of the image as "objectionable" and other portions of the image as "non-objectionable." In various examples, the user may select individual pixels and classify these pixels as either objectionable or non-objectionable. In some other examples, the user may select two-dimensional image data (e.g., lines, as shown in FIG. 2) or three-dimensional image data (e.g., polygonal regions, circles, etc.) of image data for classification as objectionable and/or non-objectionable. The user-provided labels (described in further detail below) may be used to override the initial segmentation map 140 that is generated by computing device 102 and/or back-end computing device(s) 120.

In the example depicted in FIG. 2, the user has labeled non-objectionable portions 204 and objectionable portions 202. In FIG. 2, instead of selecting only the portion of the background in FIG. 1 that included the sensitive/confidential content, the user has decided to obfuscate the entire background. Accordingly, the user has labeled the background as an objectionable portion 202 and has labeled the image of themselves as non-objectionable portions 204. The labeled objectionable portions 202 and non-objectionable portions 204 may be indicator data 206.

Indicator data 206 may be used by whichever computing device performs the segmentation task. In the example depicted in FIG. 2, the indicator data 206 is sent to back-end computing device(s) 120 so that back-end computing device(s) 120 can use the indicator data 206 to perform the segmentation task. In such an example, the image data labeled with indicator data 206 is also sent to the back-end computing device(s) 120. However, in other embodiments, sender computing device 102 may perform the segmentation task. Accordingly, the indicator data 206 may be used by the sender computing device 102 during generation of a segmentation map.

Figure 3:
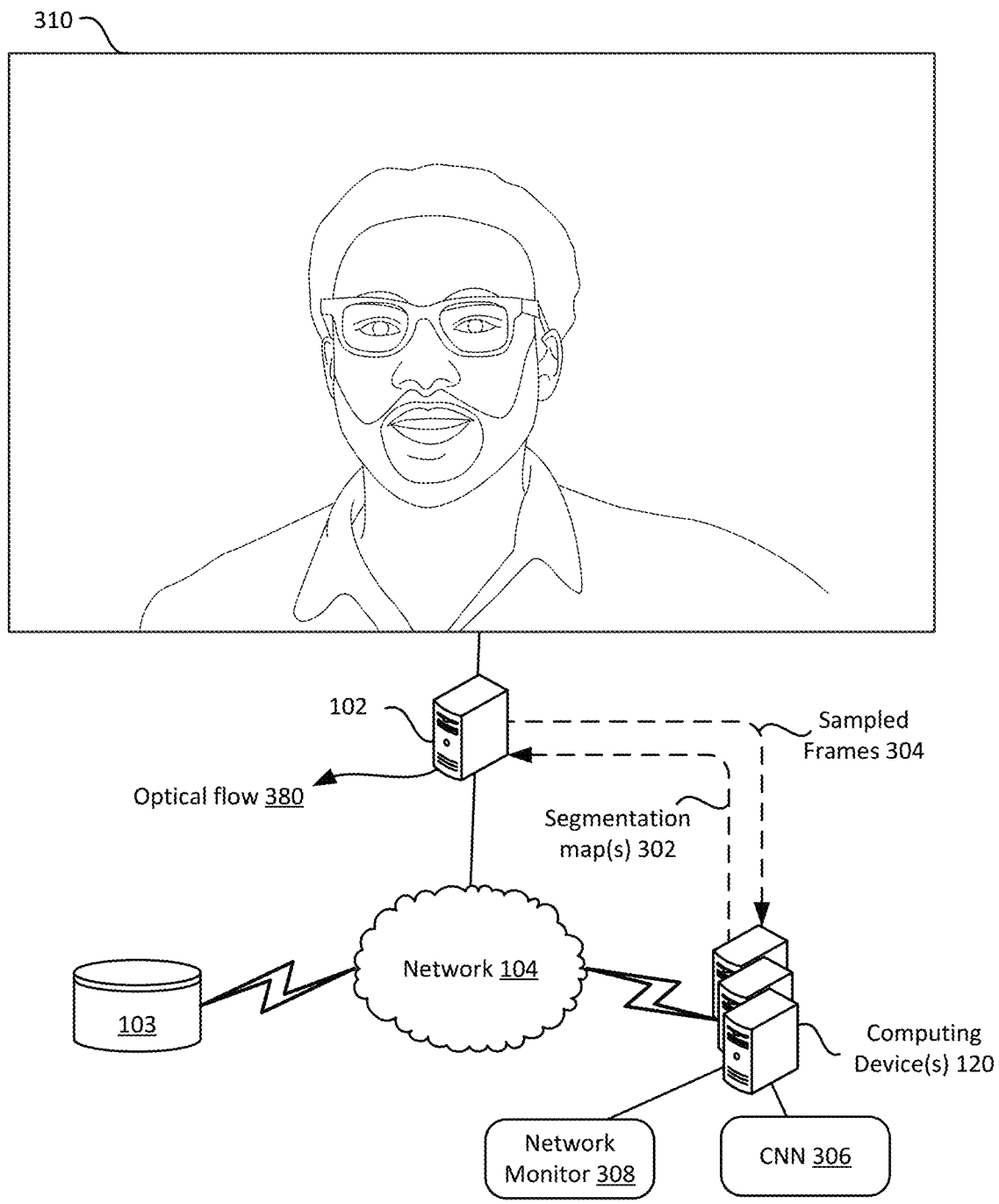
FIG. 3 depicts an example of processing sampled frames of video to generate segmentation maps, in accordance with embodiments of the present disclosure.

FIG. 3 depicts an example of processing sampled frames of video to generate segmentation maps, in accordance with embodiments of the present disclosure. In FIG. 3, a segmentation map 302 has been generated using a convolutional neural network (CNN) 306 trained to perform the segmentation task. Initially, the first segmentation map 302 may be generated using the indicator data 206 and the frame of image data (e.g., preview image 210) labeled with the indicator data 206. It should be appreciated that instead of a single frame labeled with indicator data 206, a video segment comprising multiple frames along with indicator data 206 identifying various regions of objectionable/non-objectionable content may be used to generate the initial segmentation map 302.

CNN 306 may receive the indicator data 206 and the one or more frames of image data labeled with the indicator data 206 and may generate an embedding representing the inputs. CNN 306 may output a segmentation map 302 comprising a pixel-wise map of the image data encoding each pixel as non-objectionable or objectionable. As previously described, several segmentation algorithms and/or machine learning models are known to those skilled in the art and may be employed in accordance with the present disclosure.

Although back-end computing device(s) 120 are depicted as deploying CNN 306, network monitor 308, and generating and sending segmentation map(s) 302, as previously described, these operations may instead be performed by sender computing device 102, recipient devices 130, and/or by some combination of sender computing device 102, recipient devices 130, and/or back-end computing device(s) 120.

After generating an initial segmentation map 302, an obfuscation operation may be performed using the initial segmentation map 302 to generate transmission frame 310. In the example, all pixels values denoted in the initial segmentation map 302 as objectionable have been changed to an opaque white color such that the user appears to be in front of a plain white background. In some other examples, a blur filter may be used to blur those regions denoted by the segmentation map 302 as objectionable while maintaining the clarity of those portions denoted by the segmentation map 302 as non-objectionable.

After generating an initial segmentation map 302, the video chat session may be initiated. The initial segmentation map 302 may be used to obfuscate the objectionable content on a frame-by-frame basis as the video chat is conducted. Additionally, updated segmentation maps 302 may be generated to account for movement in the frame. For example, an updated segmentation map 302 may be generated once every X frames (e.g., after a threshold number of frames since generation of the last segmentation map 302). Frames may be sampled (e.g., sampled frames 304) according to a sampling frequency (e.g., the inverse of the threshold number described above).

In various examples, the sampling frequency of sampled frames 304 may be dynamically adjusted to maintain video quality. Accordingly, a network monitor 308 may be used to determine current network conditions. If network conditions decline, the sampling frequency may be decreased (e.g., the threshold number may be increased) so that fewer segmentation maps are generated for a given amount of time. Conversely, if network conditions improve, the sampling frequency may be increased (e.g., the threshold number may be decreased) so that segmentation maps are generated more frequently.

The segmentation maps may be used to obfuscate the objectionable content for each frame of the video until a new segmentation map is generated. Accordingly, the most recently-generated segmentation map may be used to obfuscate objectionable content in the video.

In various examples, optical flow 380 between frames of image data of the video may be determined. In one embodiment, a new segmentation maps 302 may be generated in response to the motion in a current frame of video (e.g., the optical flow 380) exceeding a predetermined motion threshold. In another embodiment, the frequency at which new segmentation maps 302 are generated may be increased in response to the motion in a current frame of video exceeding a predetermined motion threshold and/or in response to the motion increasing by greater than or equal to a threshold percentage relative to a previous frame. Various methods for determining optical flow 380 may be used. For example, phase correlation, minimizing the sum of squared differences (or absolute differences) between corresponding macroblocks, differential methods, etc., may be used to determine optical flow between two frames of image data.

Figure 4:
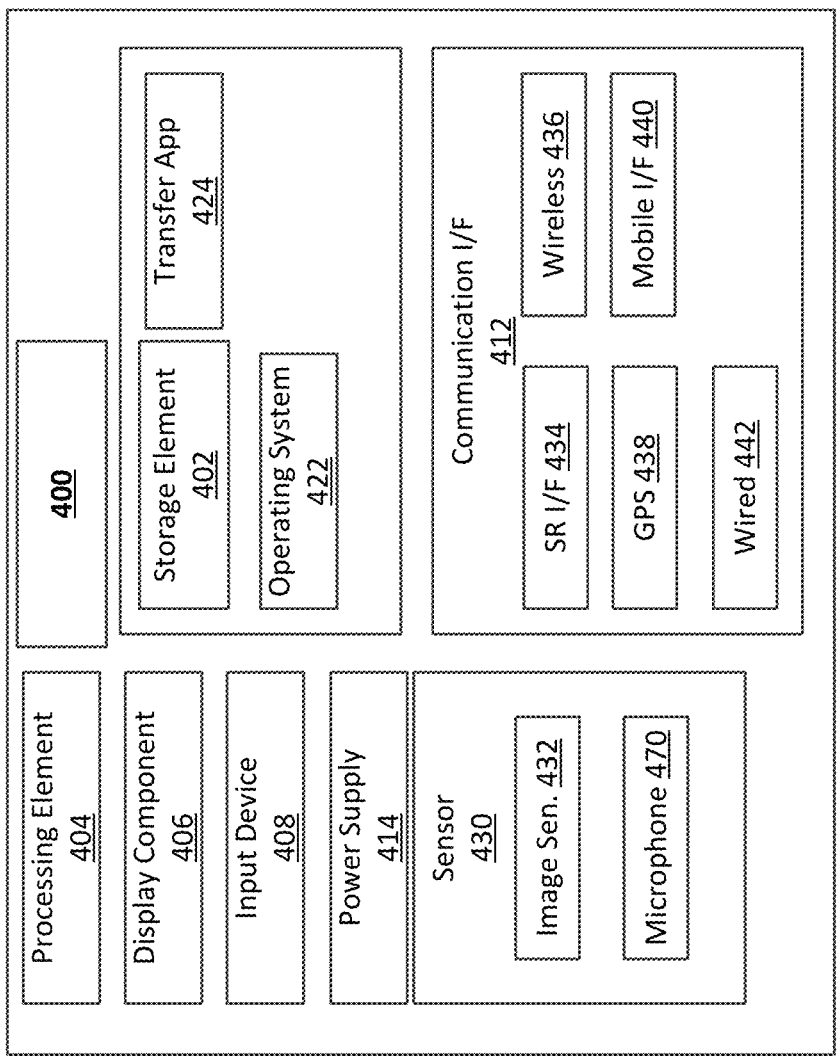
FIG. 4 depicts an example computing architecture that may be used in accordance with various aspects of the present disclosure.

FIG. 4 is a block diagram showing an example architecture 400 of a computing device, such as the sender computing device 102, back-end computing device(s) 120, and/or other computing devices described herein. It will be appreciated that not all user devices will include all of the components of the architecture 400 and some user devices may include additional components not shown in the architecture 400. The architecture 400 may include one or more processing elements 404 for executing instructions and retrieving data stored in a storage element 402. The processing element 404 may comprise at least one processor. Any suitable processor or processors may be used. For example, the processing element 404 may comprise one or more digital signal processors (DSPs). In some examples, the processing element 404 may be effective to perform object segmentation techniques for image data, as described above. The storage element 402 can include one or more different types of memory, data storage, or computer-readable storage media devoted to different purposes within the architecture 400. For example, the storage element 402 may comprise flash memory, random-access memory, disk-based storage, etc. Different portions of the storage element 402, for example, may be used for program instructions for execution by the processing element 404, storage of images or other digital works, and/or a removable storage for transferring data to other devices, etc.

The storage element 402 may also store software for execution by the processing element 404. An operating system 422 may provide the user with an interface for operating the user device and may facilitate communications and commands between applications executing on the architecture 400 and various hardware thereof. A transfer application 424 may be configured to send and/or receive image and/or video data to and/or from other devices (e.g., a mobile device, remote device, image capture device, and/or display device). In some examples, the transfer application 424 may also be configured to upload the received images to another device that may perform processing as described herein (e.g., a mobile device or another computing device).

When implemented in some user devices, the architecture 400 may also comprise a display component 406. The display component 406 may comprise one or more light-emitting diodes (LEDs) or other suitable display lamps. Also, in some examples, the display component 406 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 400 may also include one or more input devices 408 operable to receive inputs from a user. The input devices 408 can include, for example, a push button, touch pad, touch screen, wheel, joystick, keyboard, mouse, trackball, keypad, light gun, game controller, or any other such device or element whereby a user can provide inputs to the architecture 400. These input devices 408 may be incorporated into the architecture 400 or operably coupled to the architecture 400 via wired or wireless interface. In some examples, architecture 400 may include a microphone 470 for capturing sounds, such as voice commands. When the display component 406 includes a touch-sensitive display, the input devices 408 can include a touch sensor that operates in conjunction with the display component 406 to permit users to interact with the image displayed by the display component 406 using touch inputs (e.g., with a finger or stylus). The architecture 400 may also include a power supply 414, such as a wired alternating current (AC) converter, a rechargeable battery operable to be recharged through conventional plug-in approaches, or through other approaches such as capacitive or inductive charging.

The communication interface 412 may comprise one or more wired or wireless components operable to communicate with one or more other user devices. For example, the communication interface 412 may comprise a wireless communication module 436 configured to communicate on a network, such as the network 104, according to any suitable wireless protocol, such as IEEE 802.11 or another suitable wireless local area network (WLAN) protocol. A short range interface 434 may be configured to communicate using one or more short range wireless protocols such as, for example, near field communications (NFC), Bluetooth, Bluetooth LE, etc. A mobile interface 440 may be configured to communicate utilizing a cellular or other mobile protocol. A Global Positioning System (GPS) interface 438 may be in communication with one or more earth-orbiting satellites or other suitable position-determining systems to identify a position of the architecture 400. A wired communication module 442 may be configured to communicate according to the USB protocol or any other suitable protocol.

The architecture 400 may also include one or more sensors 430 such as, for example, one or more position sensors, image sensors, and/or motion sensors. An image sensor 432 is shown in FIG. 4. Some examples of the architecture 400 may include multiple image sensors 432. For example, a panoramic camera system may comprise multiple image sensors 432 resulting in multiple images and/or video frames that may be stitched and may be blended to form a seamless panoramic output.

Figure 5:
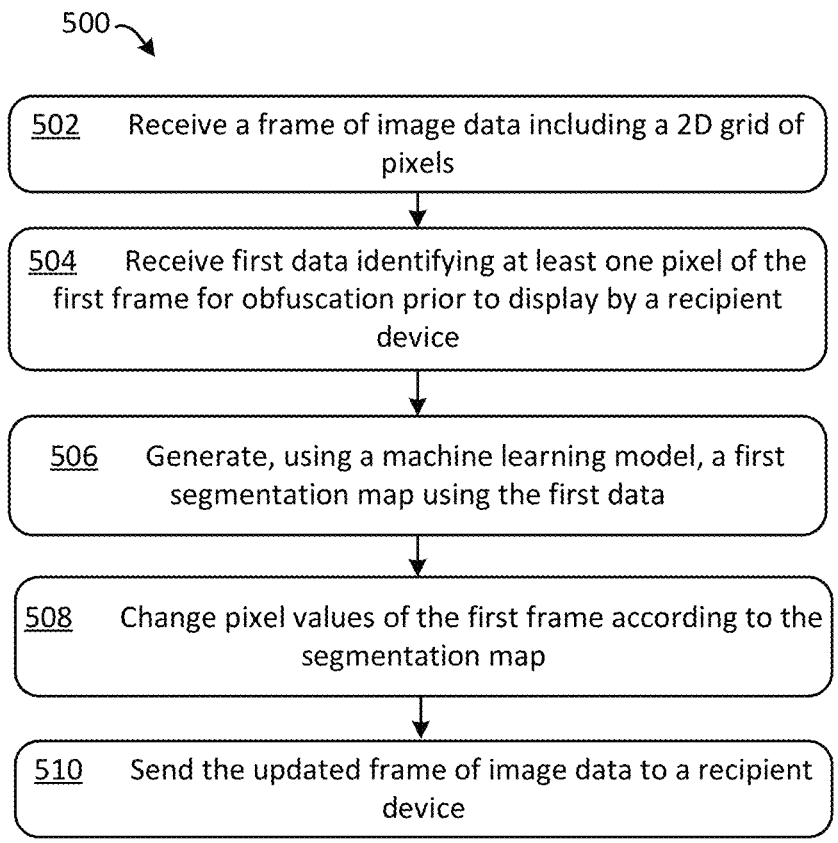
FIG. 5 depicts a flowchart illustrating an example process for identifying and obfuscating/removing objectionable content from a video stream, in accordance with embodiments of the present disclosure.

FIG. 5 depicts a flowchart illustrating an example process for identifying and removing objectionable content from a video stream, in accordance with embodiments of the present disclosure. Those portions of FIG. 5 that have been previously discussed in reference to FIGS. 1-4 may not be described again for purposes of clarity and brevity. The actions of the process 500 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Processing may begin at action 502, at which a frame of image data including a two-dimensional grid of pixels may be received. In various examples, a preview frame and/or video may be displayed to the user, as depicted in FIG. 2.

Processing may continue from action 502 to action 504, at which first data (e.g., indicator data 206) may be received. The first data may identify at least one pixel of the first frame for obfuscation prior to display by a recipient device. As previously described, the indicator data may indicate pixels and/or groups of pixels in the preview frame(s) that correspond to sensitive content that should be obfuscated. Additionally, the indicator data may indicate pixels and/or groups of pixels in the preview frame(s) that correspond to content that should not be obfuscated (e.g., non-objectionable content).

Processing may continue from action 504 to action 506, at which a segmentation map may be generated using the indicator data and the preview frame(s) of image data. The segmentation map may be a pixel-wise map encoding each pixel as either "objectionable" (e.g., to be obfuscated) or "non-objectionable" (e.g., not to be obfuscated). Processing may continue from action 506 to action 508, at which the pixel values of the preview frame(s) may be changed according to the segmentation map. For example, all pixels encoded by the segmentation map as "objectionable" may be blurred using a blur filter. Conversely, all pixels encoded by the segmentation map as "non-objectionable" may be unchanged. Accordingly, the segmentation map may be used to generate an updated frame of image data for transmission to and display by the recipient device. At action 510, the updated frame may be sent to the recipient device.

Figure 6:
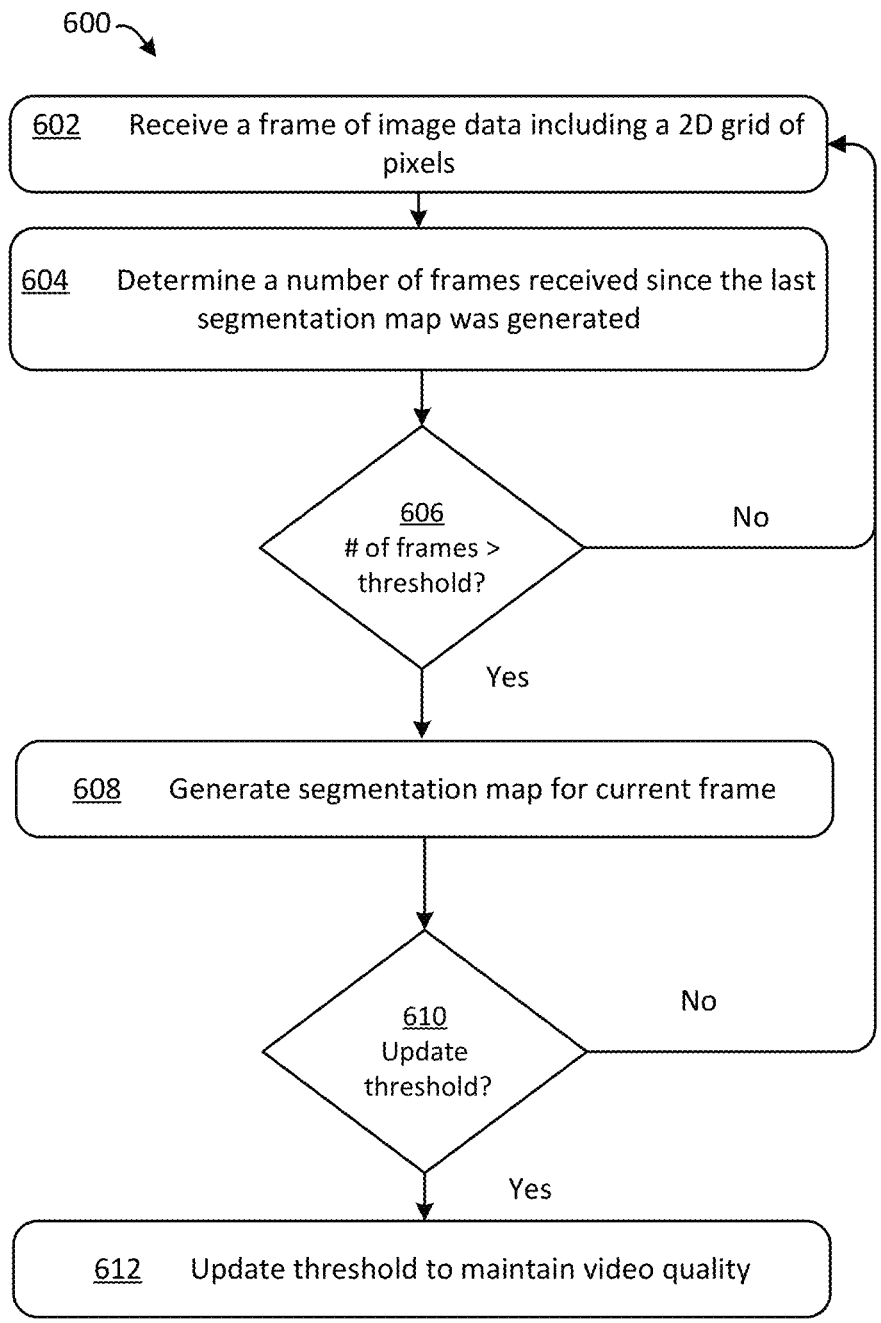
FIG. 6 depicts a flowchart illustrating an example process for determining when to generate an updated segmentation map for obfuscating objectionable content, in accordance with embodiments of the present disclosure.

FIG. 6 depicts a flowchart illustrating an example process for determining when to generate an updated segmentation map for obfuscating objectionable content, in accordance with embodiments of the present disclosure. Those portions of FIG. 6 that have been previously discussed in reference to FIGS. 1-5 may not be described again for purposes of clarity and brevity. The actions of the process 600 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 600 may begin at action 602 at which a frame of image data including a two-dimensional grid of pixels may be received. At action 604 a determination may be made as to the number of frames that have been encoded and/or transmitted since the last segmentation map was generated. At action 606 a determination may be made whether the current number of frames determined at action 604 exceeds a threshold. If so, processing may proceed to action 608. If not, processing may return to action 602, at which the subsequent frame of video may be received.

At action 608, if the number of frames encoded and/or transmitted since the last segmentation map was generated exceeds the threshold value, a new segmentation map may be generated using the current frame. In various examples, the new segmentation map may account for the movement of the objectionable content with respect to the previous segmentation map. For example, if the camera has moved and the resultant frame represents the objectionable content at a slightly different location due to the camera movement, the CNN may detect that the image data specified as objectionable (e.g., using indicator data 206) has moved from one location in the frame to another. Accordingly, the new segmentation mask may account for movement of objectionable and non-objectionable content such that the objectionable content is not displayed on the recipient device.

At action 610, a determination may be made whether the threshold (e.g., the sampling frequency) should be updated. In various examples, the sampling frequency may be updated at action 612 in order to maintain an acceptable level of video quality (e.g., a target bitrate, framerate, etc.). In some further examples, the sampling frequency may be updated in response to changing network conditions. For example, the sampling frequency may be decreased in response to a reduction in available bandwidth on the communication channel. In another example, the sampling frequency may be increased as a bitrate of the video stream increases. An increasing bitrate may be related to increased motion in the video. Accordingly, the sampling frequency may be increased to ensure that the current segmentation maps correctly denote the location of objectionable content.

Figure 7:
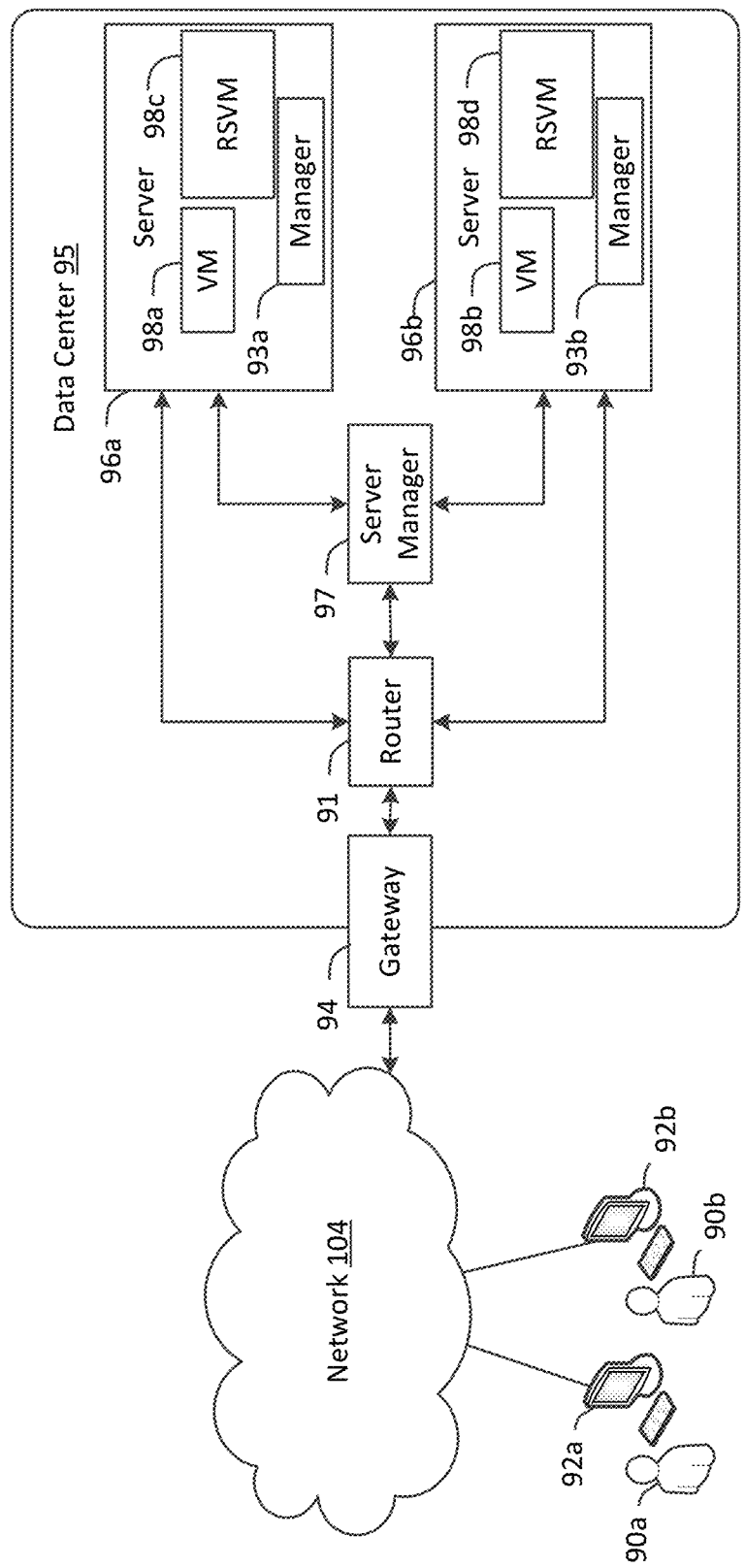
FIG. 7 depicts an example system for sending and providing data over a network, in accordance with various embodiments of the present disclosure.

An example system for sending and providing data will now be described in detail. In particular, FIG. 7 illustrates an example computing environment in which the embodiments described herein may be implemented. FIG. 7 is a diagram schematically illustrating an example of a data center 95 that can provide computing resources to users 90a and 90b (which may be referred herein singularly as user 90 or in the plural as users 90) via user computers or other network-connected computing devices 92a and 92b (which may be referred herein singularly as computer 92 or in the plural as computers 92) via network 104. In various examples, sender computing device 102 depicted in FIG. 1 may be an example of a computer or other network-connected device 92a and/or 92b. Data center 95 may be configured to provide computing resources for executing applications on a permanent or an as-needed basis. The computing resources provided by data center 95 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like.

These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 95 may include servers 96a and 96b (which may be referred herein singularly as server 96 or in the plural as servers 96) that provide computing resources. These resources may be available as bare metal resources or as virtual machine instances 98a-d (which may be referred herein singularly as virtual machine instance 98 or in the plural as virtual machine instances 98). Virtual machine instances 98c and 98d are rendition switching virtual machine ("RSVM") instances. The RSVM virtual machine instances 98c and 98d may be configured to perform all, or any portion, of the techniques for improved rendition switching and/or any other of the disclosed techniques in accordance with the present disclosure and described in detail above. As should be appreciated, while the particular example illustrated in FIG. 7 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 7, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to computers 92. User computers 92 may be computers utilized by users 90 or other customers of data center 95. For instance, user computer 92a or 92b may be a server, a desktop or laptop personal computer, a tablet computer, a wireless telephone, a personal digital assistant (PDA), an e-book reader, a game console, a set-top box or any other computing device capable of accessing data center 95. User computer 92a or 92b may connect directly to the Internet (e.g., via a cable modem or a Digital Subscriber Line (DSL)). Although only two user computers 92a and 92b are depicted, it should be appreciated that there may be multiple user computers.

User computers 92 may also be utilized to configure aspects of the computing resources provided by data center 95. In this regard, data center 95 might provide a gateway or web interface through which aspects of its operation may be configured through the use of a web browser application program executing on user computer 92. Alternately, a stand-alone application program executing on user computer 92 might access an application programming interface (API) exposed by data center 95 for performing the configuration operations. Other mechanisms for configuring the operation of various web services available at data center 95 might also be utilized.

Servers 96 shown in FIG. 7 may be servers configured appropriately for providing the computing resources described above and may provide computing resources for executing one or more web services and/or applications. In one embodiment, the computing resources may be virtual machine instances 98. In the example of virtual machine instances, each of the servers 96 may be configured to execute an instance manager 93a or 93b (which may be referred herein singularly as instance manager 93 or in the plural as instance managers 93) capable of executing the virtual machine instances 98. The instance managers 93 may be a virtual machine monitor (VMM) or another type of program configured to enable the execution of virtual machine instances 98 on server 96, for example. As discussed above, each of the virtual machine instances 98 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 95 shown in FIG. 7, a router 91 may be utilized to interconnect the servers 96a and 96b. Router 91 may also be connected to gateway 94, which is connected to network 104. Router 91 may be connected to one or more load balancers, and alone or in combination may manage communications within networks in data center 95, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 95 shown in FIG. 7, a server manager 97 is also employed to at least in part direct various communications to, from and/or between servers 96a and 96b. While FIG. 7 depicts router 91 positioned between gateway 94 and data center 95, this is merely an exemplary configuration. In some cases, for example, data center 95 may be positioned between gateway 94 and router 91. Data center 95 may, in some cases, examine portions of incoming communications from user computers 92 to determine one or more appropriate servers 96 to receive and/or process the incoming communications. Data center 95 may determine appropriate servers to receive and/or process the incoming communications based on factors such as an identity, location or other attributes associated with user computers 92, a nature of a task with which the communications are associated, a priority of a task with which the communications are associated, a duration of a task with which the communications are associated, a size and/or estimated resource usage of a task with which the communications are associated and many other factors. Data center 95 may, for example, collect or otherwise have access to state information and other information associated with various tasks in order to, for example, assist in managing communications and other operations associated with such tasks.

It should be appreciated that the network topology illustrated in FIG. 7 has been greatly simplified and that many more networks and networking devices may be utilized to interconnect the various computing systems disclosed herein. These network topologies and devices should be apparent to those skilled in the art.

It should also be appreciated that data center 95 described in FIG. 7 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of lower latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be sent as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. The various features and processes described above may be used independently of one another, or may be combined in various ways. All possible combinations and subcombinations are intended to fall within the scope of this disclosure.

In addition, conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Although this disclosure has been described in terms of certain example embodiments and applications, other embodiments and applications that are apparent to those of ordinary skill in the art, including embodiments and applications that do not provide all of the benefits described herein, are also within the scope of this disclosure. The scope of the inventions is defined only by the claims, which are intended to be construed without reference to any definitions that may be explicitly or implicitly included in any incorporated-by-reference materials.

What is claimed is:

1. A method of managing objectionable content in live video, comprising:
   receiving, by a server from a sender computing device, a first frame of image data representing a first image depicting a user and a background;
   receiving, by the server from the sender computing device, first indicator data identifying a first region of the first image as acceptable for transmission;
   receiving, by the server from the sender computing device, second indicator data identifying a second region of the first image as inacceptable for transmission;
   determining, by a machine learning model using the first indicator data and the second indicator data, a first segmentation map for the first frame of image data;
   generating a first transmission frame by applying the first segmentation map to the first frame of image data, wherein applying the first segmentation map comprises blurring pixel values of pixels of the second region; and
   sending the first transmission frame to a recipient device.

2. The method of claim 1, further comprising:
   receiving, by the server from the sender, a second frame of image data, wherein the second frame of image data is subsequent to the first frame of image data in a video stream sent from the sender computing device to the server;
   determining that a number of frames received from the sender computing device since determining the first segmentation map is less than a threshold number of frames for generating segmentation maps for the video stream;
   generating a second transmission frame by applying the first segmentation map to the second frame of image data; and
   sending the second transmission frame to the recipient device.

3. The method of claim 2, further comprising:
   receiving, by the server from the sender, a third frame of image data, wherein the third frame of image data is subsequent to the first frame of image data and the second frame of image data in the video stream;
   determining that the number of frames received from the sender computing device since determining the first segmentation map is greater than the threshold number of frames;
   determining, by the machine learning model, a second segmentation map for the third frame of image data;
   generating a third transmission frame by applying the second segmentation map to the third frame of image data; and
   sending the third transmission frame to the recipient device.

4. The method of claim 2, further comprising:
   determining that an amount of available bandwidth between the server and the recipient computing device has decreased from a first amount of available bandwidth associated with a first bitrate to a second amount of available bandwidth associated with a second bitrate;
   determining a quantity by which to increase the threshold number of frames such that a bitrate of the video stream corresponds to the second bitrate; and
   increasing the threshold number of frames by the determined quantity.

5. A method comprising:
   receiving, by a first computing device from a sender computing device, a first frame of image data comprising a two-dimensional grid of pixels;
   receiving, by the first computing device from the sender computing device, first indicator data identifying at least one pixel of the first frame for obfuscation prior to display by a recipient computing device;
   generating, by a machine learning model, a first segmentation map based at least in part on the first indicator data;
   changing pixel values of one or more pixels of the first frame of image data according to the first segmentation map to generate an updated first frame of image data; and
   sending, by the first computing device, the updated first frame of image data to the recipient computing device.

6. The method of claim 5, further comprising:
   receiving a second frame of image data, wherein the second frame is sequential to the first frame in a video stream being sent to the recipient computing device;

changing pixel values of one or more pixels of the second frame of image data according to the first segmentation map to generate an updated second frame of image data; and sending the updated second frame of image data to the recipient computing device.

7. The method of claim 5, further comprising:

receiving a second frame of image data;

determining a number of frames of image data that have been received since the first segmentation map was generated;

determining that the number of frames exceeds a threshold number of frames;

generating, by the machine learning model, a second segmentation map based at least in part on changes between the first frame of image data and the second frame of image data;

changing pixel values of one or more pixels of the second frame of image data according to the second segmentation map to generate an updated second frame of image data; and sending the second frame of image data to the recipient computing device.

8. The method of claim 5, further comprising:

receiving a second frame of image data;

determining a number of frames of image data that have been received since the first segmentation map was generated;

determining that the number of frames is less than a threshold number of frames;

changing pixel values of one or more pixels of the second frame of image data according to the first segmentation map to generate an updated second frame of image data; and sending the updated second frame of image data to the recipient computing device.

9. The method of claim 5, wherein the first segmentation map comprises a binary label value for each pixel of the two-dimensional grid of pixels, wherein a first binary label value indicates that a current pixel value is retained, wherein and a second binary label value indicates that the current pixel value is to be changed prior to transmission.

10. The method of claim 5, further comprising:

determining an optical flow between the first frame of image data and a second frame of image data;

determining that the optical flow exceeds a motion threshold; and generating, by the machine learning model, a second segmentation map based at least in part on the optical flow exceeding the motion threshold.

11. The method of claim 5, further comprising receiving second indicator data identifying at least one pixel of the first frame for display by the recipient computing device without obfuscation, wherein the generating, by the machine learning model, the first segmentation map is further based at least in part on the second indicator data.

12. The method of claim 5, further comprising:

receiving second indicator data identifying at least one pixel of the first frame for display by the recipient computing device without obfuscation, wherein the second indicator data identifies at least one pixel representing a user, and wherein the first indicator data identifies at least one pixel representing a logo on an article of clothing worn by the user, wherein the generating, by the machine learning model, the first segmentation map is further based at least in part on the second indicator data.

13. A system comprising:

at least one processor; and at least one non-transitory computer-readable memory that, when executed by the at least one processor, is effective to program the at least one processor to:

receive, by a first computing device from a sender computing device, a first frame of image data comprising a two-dimensional grid of pixels;

receive first indicator data identifying at least one pixel of the first frame for obfuscation prior to display by a recipient computing device;

generate, by a machine learning model, a first segmentation map based at least in part on the first indicator data identifying the at least one pixel of the first frame;

change pixel values of one or more pixels of the first frame of image data according to the first segmentation map to generate an updated first frame of image data; and send, by the first computing device, the updated first frame of image data to the recipient computing device.

14. The system of claim 13, wherein the at least one non-transitory computer-readable memory stores further instructions that, when executed by the at least one processor, are further effective to program the at least one processor to:

receive a second frame of image data, wherein the second frame is sequential to the first frame in a video stream being sent to the recipient computing device;

change pixel values of one or more pixels of the second frame of image data according to the first segmentation map to generate an updated second frame of image data; and send the updated second frame of image data to the recipient computing device.

15. The system of claim 13, wherein the at least one non-transitory computer-readable memory stores further instructions that, when executed by the at least one processor, are further effective to program the at least one processor to:

receive a second frame of image data;

determine a number of frames of image data that have been received since the first segmentation map was generated;

determine that the number of frames exceeds a threshold number of frames;

generate, by the machine learning model, a second segmentation map based at least in part on changes between the first frame of image data and the second frame of image data;

change pixel values of one or more pixels of the second frame of image data according to the second segmentation map to generate an updated second frame of image data; and send the second frame of image data to the recipient computing device.

16. The system of claim 13, wherein the at least one non-transitory computer-readable memory stores further instructions that, when executed by the at least one processor, are further effective to program the at least one processor to:

receive a second frame of image data;

determine a number of frames of image data that have been received since the first segmentation map was generated;

determine that the number of frames is less than a threshold number of frames;

change pixel values of one or more pixels of the second frame of image data according to the first segmentation map to generate an updated second frame of image data; and send the updated second frame of image data to the recipient computing device.

17. The system of claim 13, wherein the first segmentation map comprises a binary label value for each pixel of the two-dimensional grid of pixels, wherein a first binary label value indicates that a current pixel value is retained, wherein and a second binary label value indicates that the current pixel value is to be changed prior to transmission.

18. The system of claim 17, wherein the at least one non-transitory computer-readable memory stores further instructions that, when executed by the at least one processor, are further effective to program the at least one processor to:

apply a Gaussian kernel to pixels in the first frame of image data associated with the second binary label to blur pixel values of pixels associated with the second binary label.

19. The system of claim 13, wherein the at least one non-transitory computer-readable memory stores further instructions that, when executed by the at least one processor, are further effective to program the at least one processor to:

receive second indicator data identifying at least one pixel of the first frame for display by the recipient computing device without obfuscation, wherein the generating, by the machine learning model, the first segmentation map is further based at least in part on the second indicator data.

20. The system of claim 13, wherein the at least one non-transitory computer-readable memory stores further instructions that, when executed by the at least one processor, are further effective to program the at least one processor to:

receive second indicator data identifying at least one pixel of the first frame for display by the recipient computing device without obfuscation, wherein the second indicator data identifies at least one pixel representing a user, and wherein the first indicator data identifies at least one pixel representing a logo on an article of clothing worn by the user, wherein the generating, by the machine learning model, the first segmentation map is further based at least in part on the second indicator data.

\* \* \* \* \*